(No Model.)   2 Sheets—Sheet 1.

W. J. JOHNSON.
FLOUR SIFTER.

No. 304,528.   Patented Sept. 2, 1884.

Witnesses:
R. S. Barrows
Helen Frink

Inventor
William J. Johnson
by his attorney, A. H. Farrell (No Model.)  2 Sheets—Sheet 2.

W. J. JOHNSON.
FLOUR SIFTER.

No. 304,528.  Patented Sept. 2, 1884.

Witnesses:
R. S. Barrows
Alwin Frink

Inventor:
William J. Johnson,
by his attorney,
N. H. Spencer

UNITED STATES PATENT OFFICE.

WILLIAM J. JOHNSON, OF NEWTON, MASSACHUSETTS.

FLOUR-SIFTER.

SPECIFICATION forming part of Letters Patent No. 304,528, dated September 2, 1884.

Application filed May 1, 1884. (No model.)

*To all whom it may concern:*

Be it known that I, WILLIAM J. JOHNSON, a citizen of the United States, residing at Newton, in the county of Middlesex and State of Massachusetts, have invented certain new and useful Improvements in Flour-Sifters; and I do hereby declare that the same are fully described in the following specification and illustrated in the accompanying drawings.

This invention relates to that class of sifters in which a beater or agitator rotates within a receptacle having a sieve of wire-gauze or equivalent material, over which the agitator is moved.

My improvement pertains to the beater, and especially to the peculiar construction of its arms and their relation to the sieve, whereby the flour or other material is pressed through the gauze and lumps are crushed.

Figure 1:
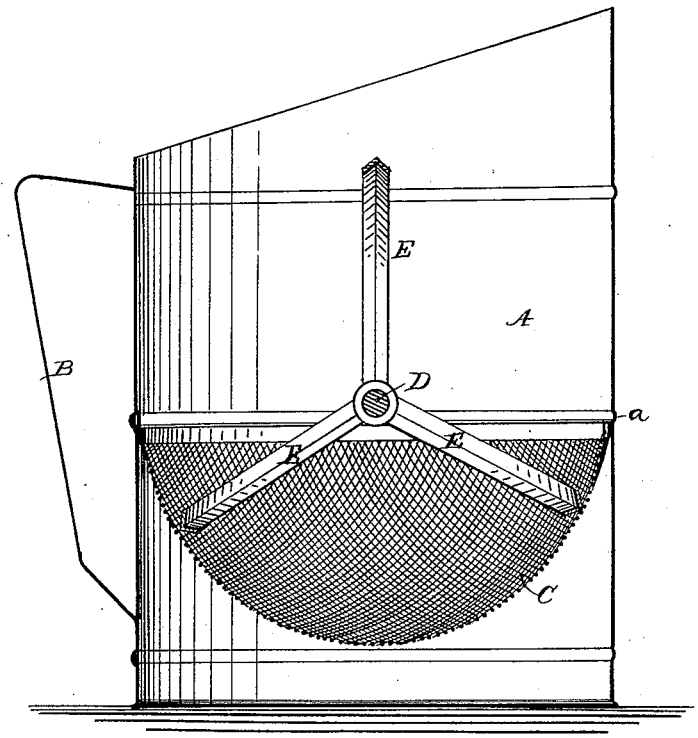
Figure 2:
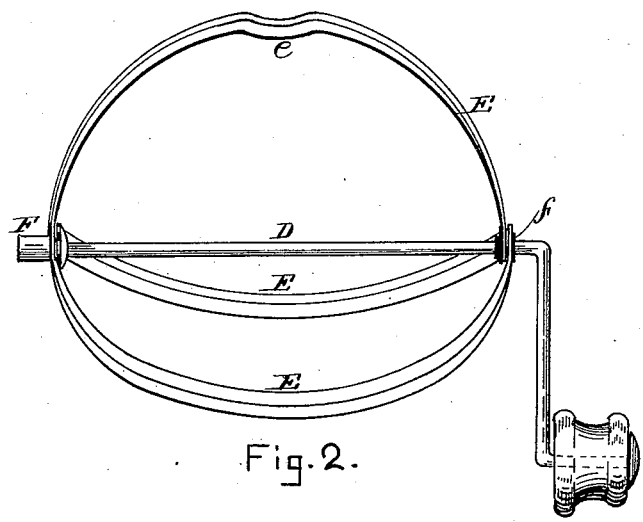
Figure 3:
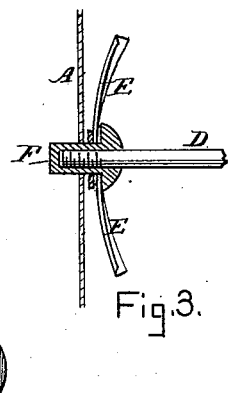
Figure 4:
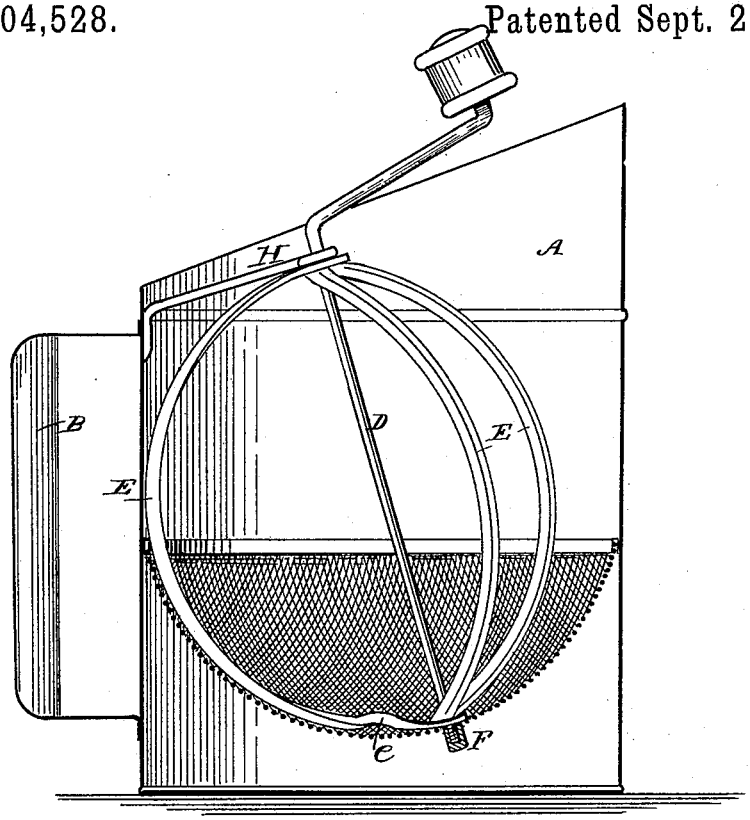
Figure 5:
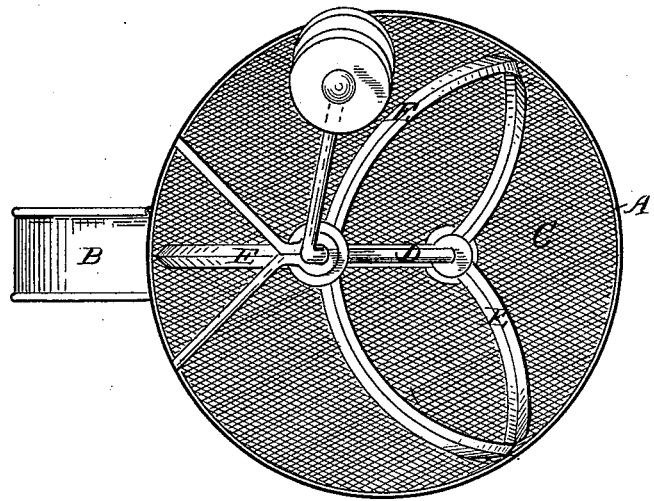
Figure 6:

In the drawings, Figure 1 shows my improved sifter in vertical section. Fig. 2 represents the beater detached from the case or body, showing the peculiar arms; and Fig. 3 is a detail of the bearing. Fig. 4 is a vertical section of a sifter having the beater in an oblique position, and Fig. 5 is a top view thereof. Fig. 6 is a detail of the beater-arm.

A is the body of the sifter—a vertical cylinder of tin or other suitable material provided with a handle, B.

C is the sieve, of wire-cloth, made nearly hemispherical and held frictionally or otherwise in position at the proper point within the cylinder by a bead formed therein, with which the margin of the sieve engages. In the form of sifter shown in Fig. 1, the beater-shaft D passes centrally across the body of the sifter, having its bearings in the opposite sides of the cylinder A immediately above the bead $a$, which determines the position of the sieve.

E E are the beater-arms, preferably three in number, standing outwardly from the shaft D in the proper curve, and suitably united to each other at each end, where they are perfectly flat. These arms are of sheet metal, having a longitudinal curve to fit within the concave sieve, and beaded or doubly beveled in cross-section, so as to press the flour through the yielding sieve, against which they bear with a moderate pressure, the apex or central line of each arm standing outwardly for that purpose. The lateral movement of these beveled arms through the flour with direct pressure upon the sieve is much more effective in sifting than that of wire arms not thus pressing. They also serve to crush small lumps of flour. For the purpose of crushing larger lumps I form one or more corrugations or inward bends in one of the arms, as at $e$, Figs. 2 and 4. Such corrugation tends to disintegrate or pulverize any lumps caught by it as the beater revolves.

The best means which I have devised for uniting the beater-arms E are illustrated in the drawings. A hollow rivet, F, passes through each of the arms where their flattened ends overlap. Its bore is screw-threaded for insertion of the threaded end of the shaft D, and the projecting end of this rivet protects the terminal thread on the shaft from wear, and forms an admirable bearing for that end of the beater, (see Fig. 3,) the tin cylinder being perforated to receive it. The arms are united at the other end, preferably by an eyelet, $f$.

In practice the beater, without its shaft, is first placed within the body A, with the hollow bearing F projecting through its perforation. Then the shaft D is introduced through the other perforation in the cylinder, and through the eyelet $f$, and, extending axially through the beater, is screwed into the hollow rivet F. In use, the turning of the crank in the same direction tightens the shaft in the head, keeping the parts in position; but by unscrewing the shaft from the head or bearing F the beater and shaft are readily removed when desired.

In Figs. 4 and 5 the beater-shaft is placed obliquely, having its lower bearing in the concave sieve, an eyelet being introduced between the wires and secured by solder or otherwise. The shaft has its upper bearing in a bracket of wire, H, or other metal.

I claim as my invention—

1. In a flour-sifter, the body A and sieve C, in combination with a rotary beater having curved sheet-metal arms E, V-shaped in cross-section, with the apex of each presented outwardly to the concave sieve and beveled each way from such line of contact, and with a crank-shaft and suitable bearings therefor, substantially as set forth.

2. The body A and sieve C, in combination with a beater having sheet-metal arms E, united together at one end by an eyelet and at the other end by a hollow rivet, F, the stem of which is internally threaded and projects outwardly to form a smooth rotary journal, with its bearing in the body A, said beater being provided with the crank-shaft D, passed loosely through said eyelet and threaded terminally to engage the female thread in the rivet, substantially as set forth.

3. In a flour-sifter, a cylindrical body and a hemispherical sieve located therein, in combination with a rotary beater, having an axial crank-shaft, D, threaded at its extremity, and a smooth rotary journal, F, surrounding and screwed upon such threaded end and projecting through a perforation in the body A, for the purpose set forth.

In testimony whereof I hereto affix my signature in presence of two witnesses.

WILLIAM J. JOHNSON.

Witnesses:
E. A. PHELPS,
A. H. SPENCER.